Figure 1:
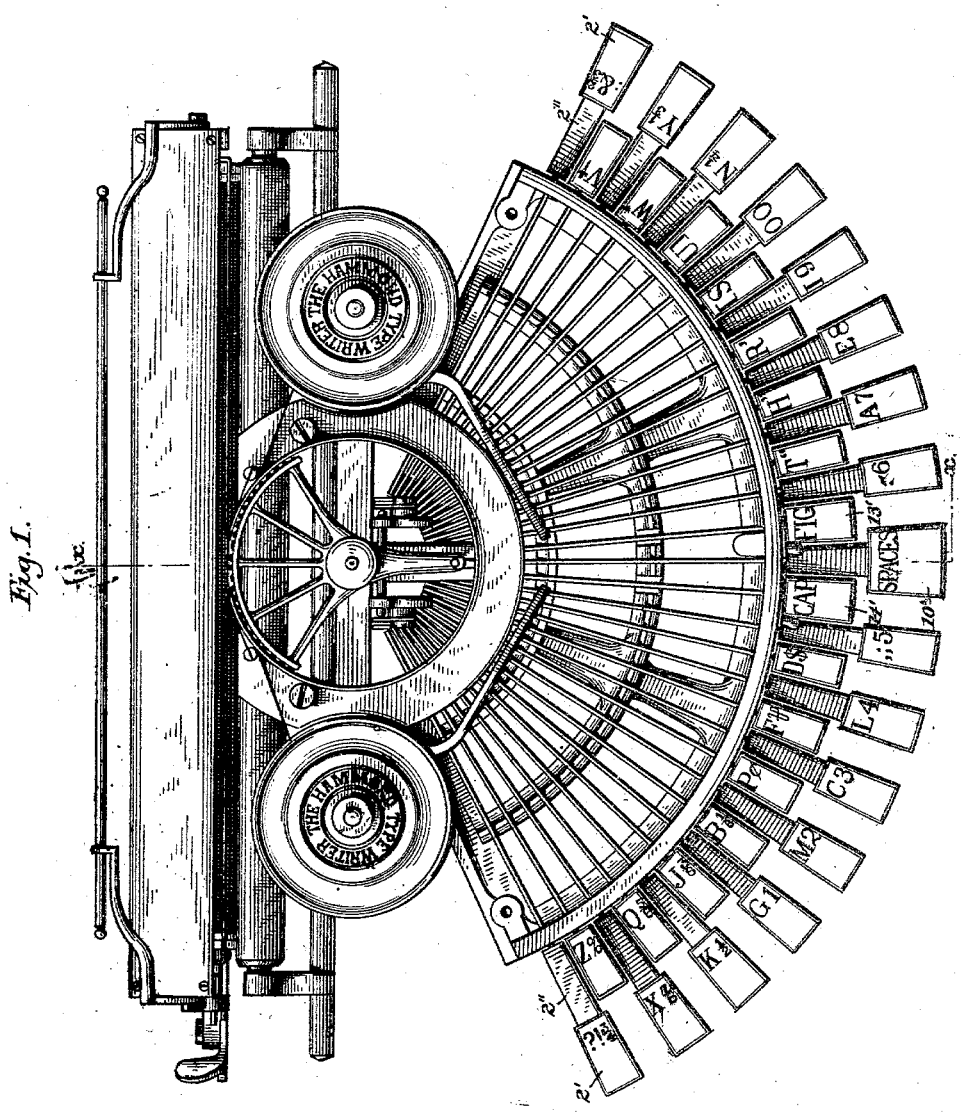

(No Model.)

9 Sheets—Sheet 1.

J. B. HAMMOND.
TYPE WRITING MACHINE.

No. 290,419. Patented Dec. 18, 1883.

Attest:
Walter Donaldson
F. L. Middleton

Inventor:
Jas. B. Hammond
by Joyce & Spear
Attys.

(No Model.)  
9 Sheets—Sheet 2.
J. B. HAMMOND.
TYPE WRITING MACHINE.
No. 290,419. Patented Dec. 18, 1883.
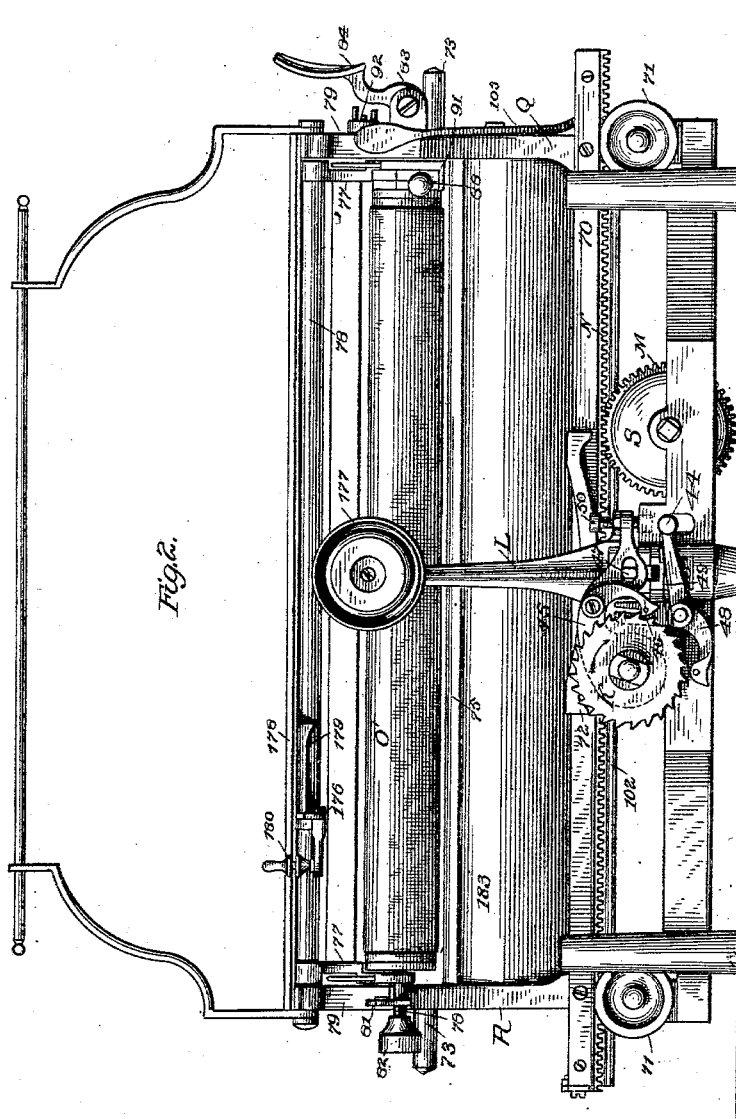

(No Model.) 9 Sheets—Sheet 3.
J. B. HAMMOND.
TYPE WRITING MACHINE.
No. 290,419. Patented Dec. 18, 1883.
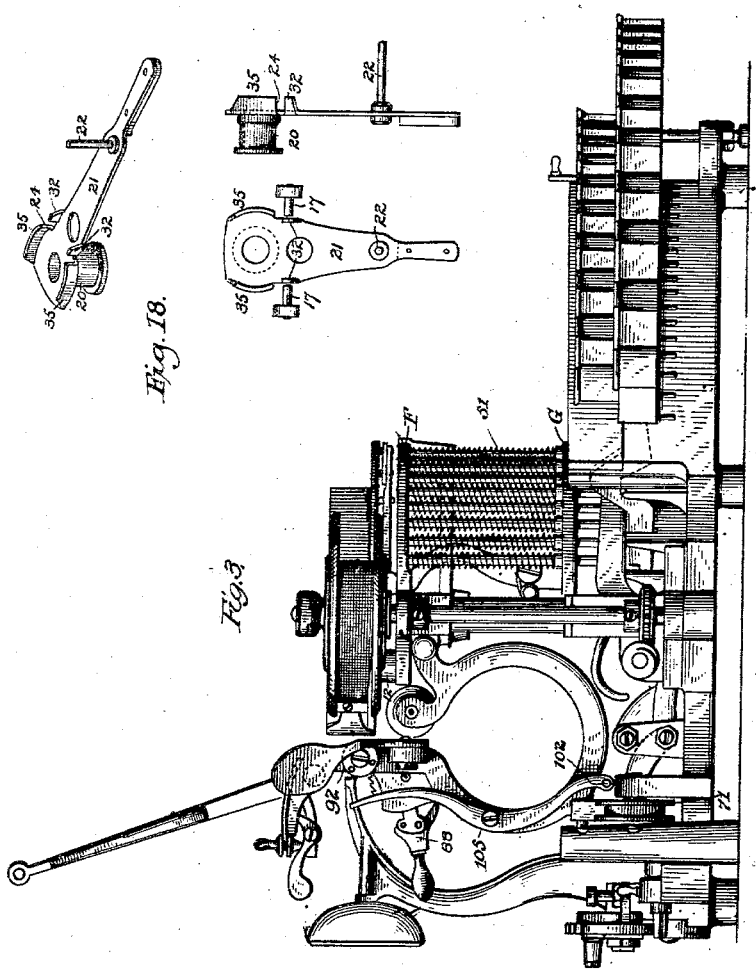

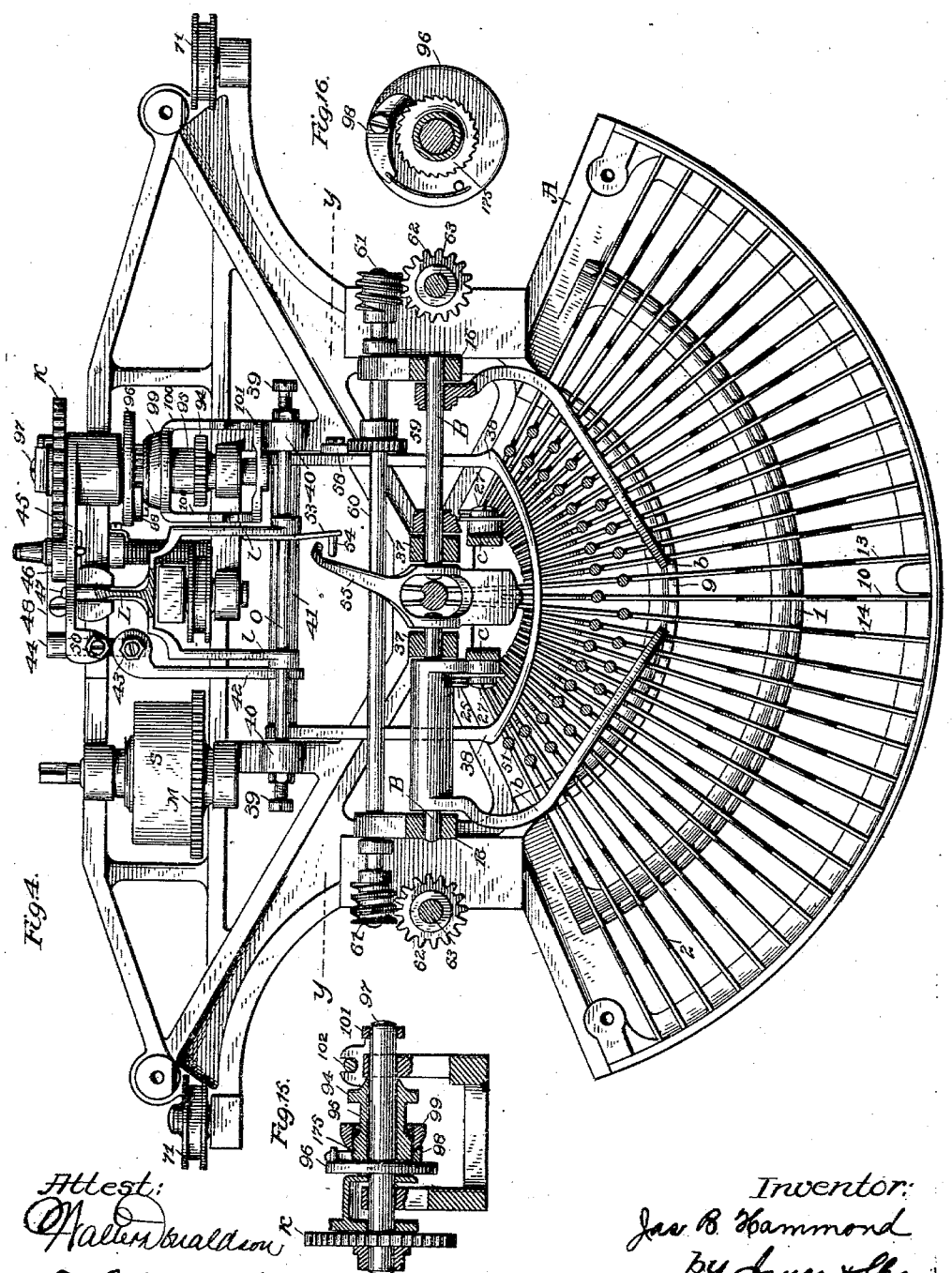

(No Model.)
J. B. HAMMOND.
TYPE WRITING MACHINE.
No. 290,419. Patented Dec. 18, 1883.
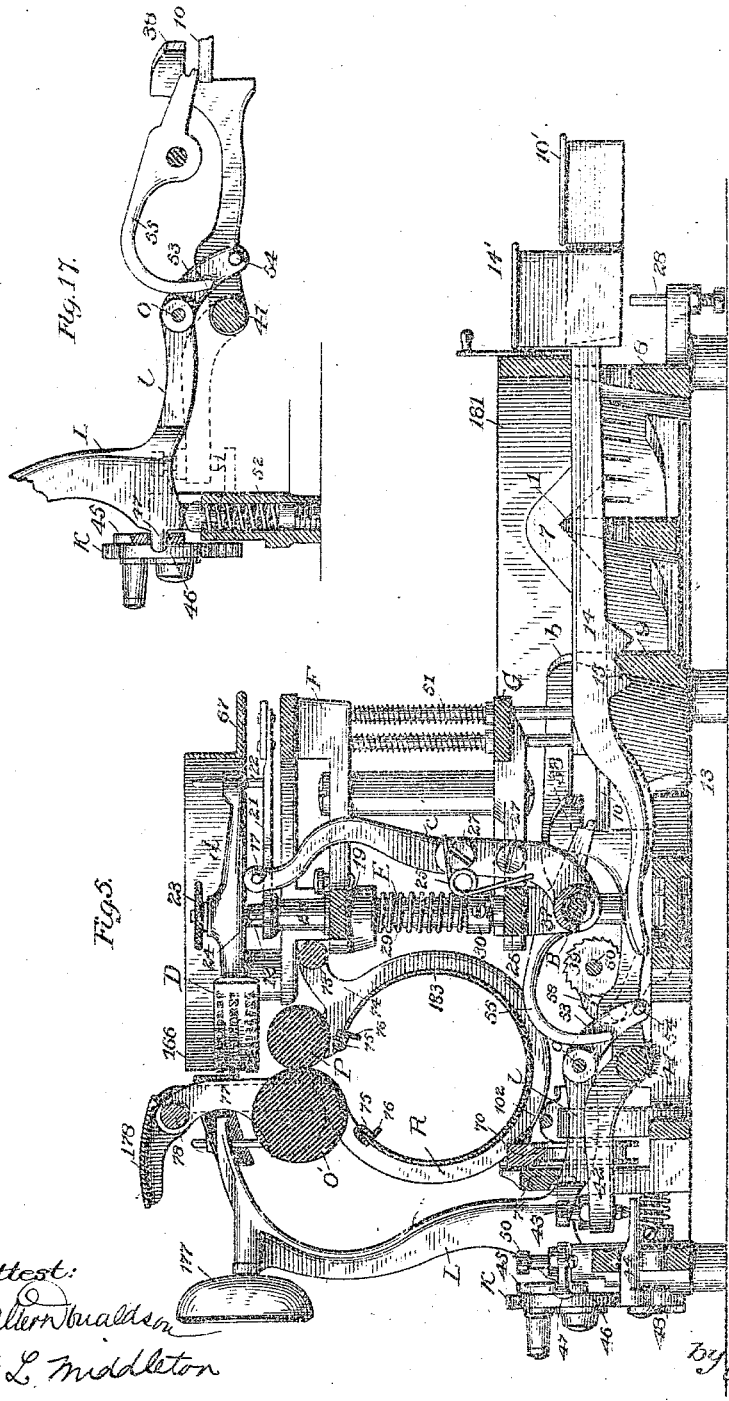
Attest:
Walter Donaldson
F. L. Middleton
Inventor
J. B. Hammond
by Joyce & Spear
Attys.

(No Model.)  9 Sheets—Sheet 6.
J. B. HAMMOND.
TYPE WRITING MACHINE.
No. 290,419.  Patented Dec. 18, 1883.
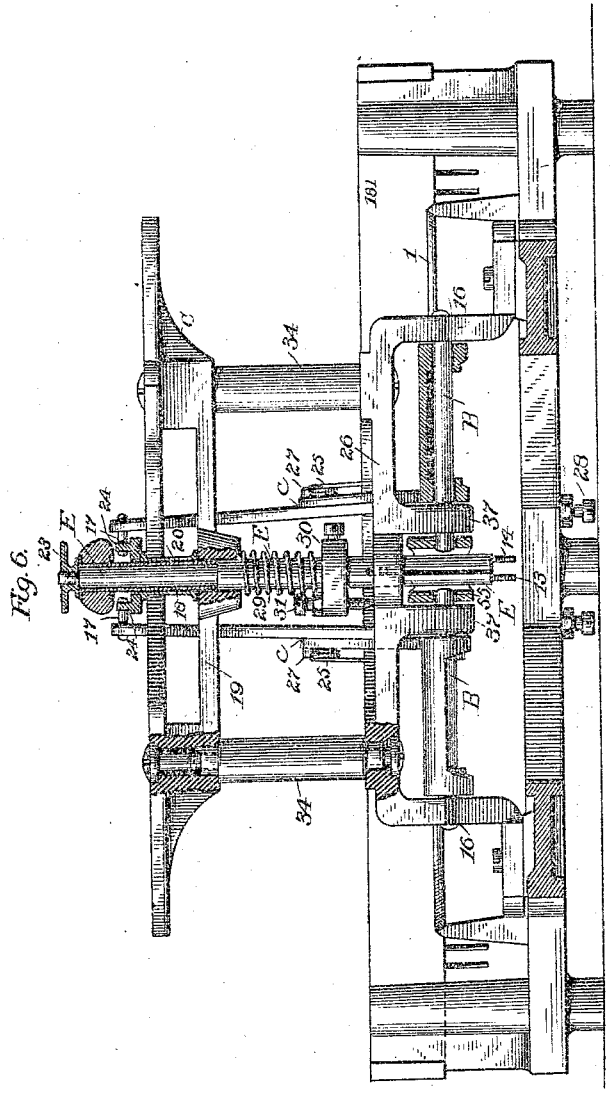
Attest:
Walter Donaldson
F. L. Middleton
Inventor
Jas. B. Hammond
by Joyce & Spear
Attys.

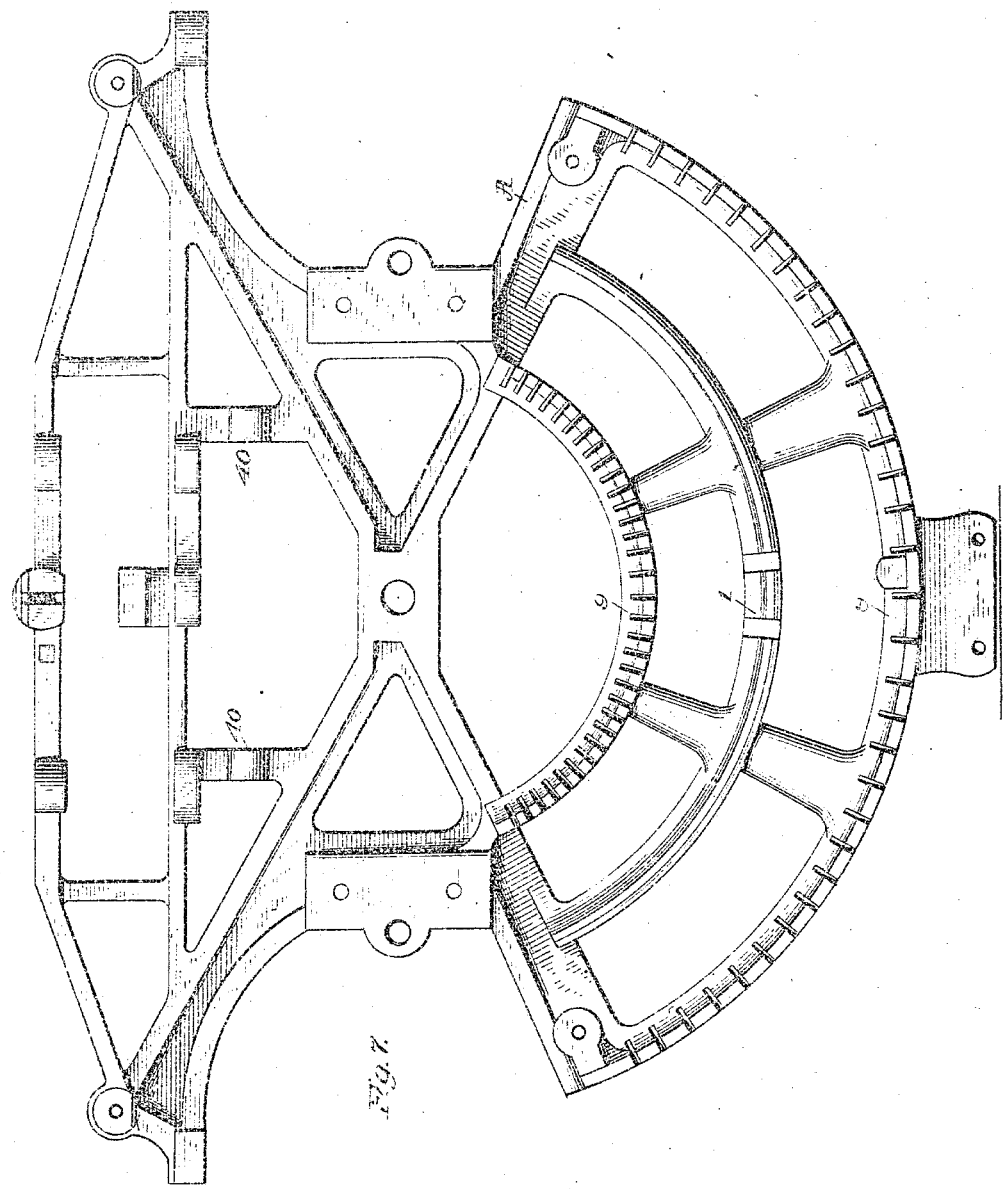

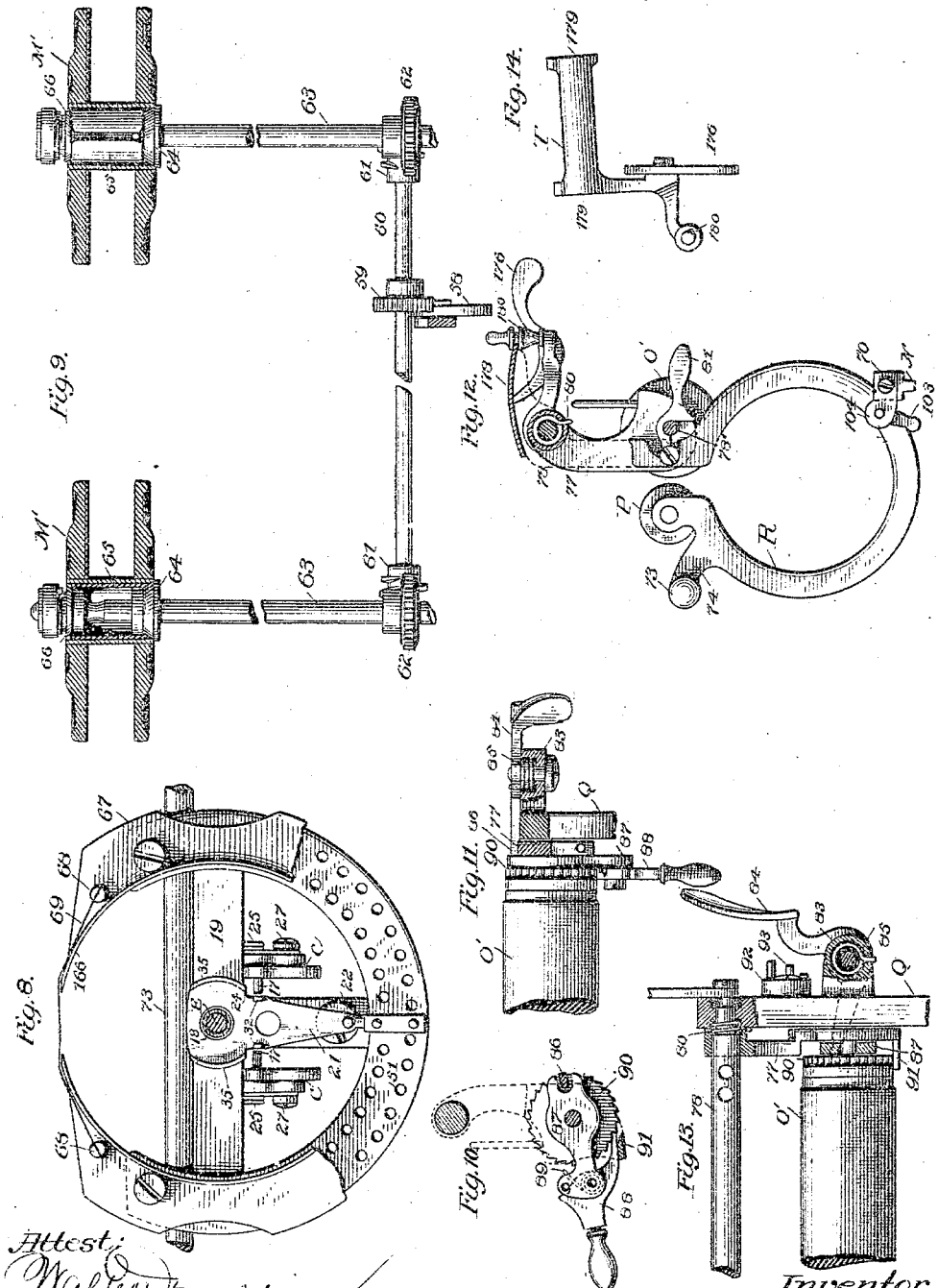

(No Model.) J. B. HAMMOND.
TYPE WRITING MACHINE.
No. 290,419. Patented Dec. 18, 1883.
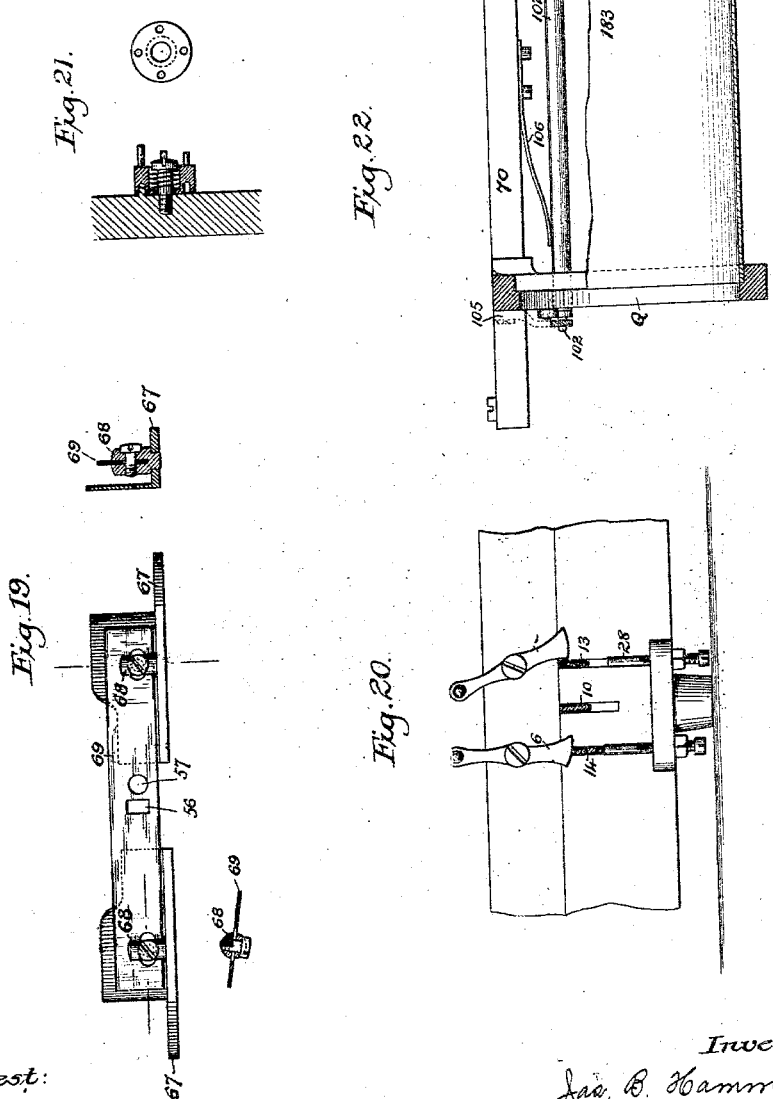
Attest:
F. L. Middleton
W. Donaldson
Inventor
Jas. B. Hammond
by Joyce & Spear
Attys

United States Patent Office.

James B. Hammond, of New York, N. Y.

TYPE-WRITING MACHINE.

SPECIFICATION forming part of Letters Patent No. 290,419, dated December 18, 1883.

Application filed September 29, 1883. (No model.)

*To all whom it may concern:*

Be it known that I, JAMES B. HAMMOND, of New York, in the county of New York and State of New York, have invented a new and useful Improvement in Type-Writing Machines; and I do hereby declare that the following is a full, clear, and exact description of the same.

My invention relates to that class of type-writing machines for which Letters Patent Nos. 224,088, 224,183, 232,402, 249,930, and 253,475 have heretofore been issued to me.

The objects of the invention are to provide a simpler, a more efficient, and a more responsive mechanism having reference to certainty and exactness of operation, and one which involves only a minimum expenditure of power by the operator, and is accompanied with but a minimum of friction; and, further, to improve all the several combinations of parts concerned in performing the several functions incident to a type-writing machine in a manner that the co-operation of these combinations shall be harmonious.

To the accomplishment of these objects my invention consists in the parts and several combinations of parts hereinafter described, and specifically referred to in the claims.

In the accompanying drawings, Figure 1 represents a plan view of the machine; Fig. 2, a rear elevation; Fig. 3, a side elevation; Fig. 4, a plan view after removal of carriage and part of center piece; Fig. 5, a vertical central transverse section on line $x$ $x$ of Fig. 1; Fig. 6, a vertical longitudinal section on line $y$ $y$ of Fig. 4; Fig. 7, a plan view of the bed-plate; Fig. 8, a plan view of the type-segment-driving mechanism and type-segment guard-plate; Fig. 9, a detached view of the ribbon-spools-operating mechanism; Figs. 10, 11, and 13, details views of the line-feed mechanism; Fig. 12, a side elevation of the paper-carriage, right-hand end; Fig. 14, the bell-hammer and its bracket; Figs. 15 and 16, detail views relating to the escapement mechanism; Fig. 17, a detail view relating to the impression-hammer and its operating mechanism; Fig. 18, a plan side elevation and isometrical view of the stop-arm and its sleeve; Fig. 19, rear and detail views of the shield and its supporting means; Fig. 20, an elevation of the locking cam-levers in connection with the type-segment-shaft-elevating levers; Fig. 21, a detail view of the line-feed regulator; Fig. 22, a part of the carriage-frame, showing spring operating on disengaging-rod.

In the following description the type-carrier will, for convenience, be termed a "type-segment;" but it is obvious that a type-wheel, or even a flat plate on which the type are similarly arranged, is its equivalent in many respects.

*The supporting-frame.*—The frame or stationary supporting part of the machine is constructed of any suitable material, preferably of cast-iron, and embraces a bed-plate, as A, and a center piece, as C. The former is made in one piece, (see Fig. 7,) and is so formed as to serve as a support for the key-levers, the key-lever return stop and retaining bar, the hammer-arm, its operating-spring, the escapement mechanism, the carriage-supporting wheels, the carriage-rack-retaining bar, the carriage-propelling mechanism, and the adjusting means for the type-wheel-shifting levers. For the support of the key-levers, three concentric ribs, of which the axis of the type wheel or segment is the common center, are provided, the intermediate rib, as 1, being formed with a knife-edge, while the others, 8 and 9, are slitted or kerfed on lines radiating from said axis. For the hammer-operating spring, a proper cavity or retaining means is provided, and for the remaining parts the necessary journal-bearings and fastening means. The center piece consists of an upper and a lower plate, as F and G, (see Fig. 6,) the latter securely connected to the bed-plate, and the two separated the necessary distance from each other by any suitable means. As one means of securing a rigid connection and proper separation of said center-piece plates, I have shown in the drawings (see Fig. 6) shouldered posts, as 34, fitting into and resting against the same, and headed screws, which, passing through said plates into screw-threaded apertures of the shouldered posts, hold the parts together. This construction may be modified by substituting for the shouldered posts plain posts or rods loosely surrounded by shorter sleeves. These center-piece plates are each provided with apertures for the passage of the stop-pins, with a cross-bar, as 19 and 26, the uses of which will hereinafter appear, and with bearings for the center and other shafts of the machine.

*Key-levers.*—The type-segment-operating key-levers, as 2, are all of the same size and shape, and each is formed with an angular notch, as 7. At this notch they are fulcrumed on the knife-edged rib, and said rib and notch, acting in conjunction, prevent longitudinal displacement of the said levers. They are made wide in a vertical direction to secure great rigidity. They are guided in their movement by the kerfs in the inner and outer concentric ribs of the bed-plate, which prevent their lateral displacement. Since said key-levers are alike in size and shape, it is evident that they can be cheaply produced from sheet metal by the use of a single die. To the outer ends of these key-levers, finger-keys, as 2', are secured, and as the latter are arranged in two rows or banks, as shown, (see Fig. 5,) it is necessary to provide alternate finger-keys with extensions, as 2'', (see Fig. 1,) passing between the finger-keys of the inner row. The extent of depression of the outer ends of the key-levers is limited by the stop-pins pressed downward by their surrounding springs, while their upward movement is limited by the key-lever return stop and retaining bar, as 18¹, which also serves, in connection with the kerfed ribs, to maintain the key-levers on their fulcrum. In addition to the key-levers for oscillating the type-segment, three other key-levers are provided—one a spacing key-lever operating only the escapement and preventing the full movement of the hammer-arm, and the remaining two type-segment-shifting levers, as will be hereinafter explained. The rear ends of the type-segment-oscillating key-levers, in their upward movement, operate directly three separate mechanisms—viz., the type-segment-oscillating mechanisms, the stop-pins, and the spacing or feed mechanism, which latter indirectly effects the impression.

*The type-segment and shaft.*—The type-segment is constructed of hard rubber, ebonite, or any analogous or suitable material. It is constructed, further, in the skeleton form shown, with light rim and spokes, so as to secure the greatest possible lightness consistent with the requisite strength. It is provided in this case with three rows of type, the upper row representing an alphabet of lower-case type, together with the more frequently used punctuation-marks; the second row an alphabet of capitals of the same font, together with marks and characters of less frequent use in writing or printing, while the third row embraces whole numbers, fractions, and such characters as are of comparatively rare use in printing. If the character of the work does not embrace figures, the type-segment may be constructed without this last row, so as to embrace only the first and second rows. In case the character of the work requires the use of capitals exclusively, or in case it is desired to use only lower-case type, the type-segment may have but one row of type, either capitals or lower-case. Type-segments of these several constructions, as well as type-segments pertaining to different fonts of type, can be furnished with each machine, and can be readily and quickly substituted one for the other, as will hereinafter appear. The type are formed on a separate plate of hard rubber, which is attached to the type-segment rim by any suitable means. The type-segment is provided with a lengthened hub or sleeve, as 18, which fits the upper end of type-segment shaft, as E, and rests against a shoulder on the same. A thumb-nut, as 23, of greater diameter than the sleeve, screws onto the screw-threaded diminished end of the type-segment shaft, but does not bind against the type-segment sleeve, so that the latter can freely rotate on the shaft, while its vertical displacement is prevented. By removing said thumb-nut the type-segment can be quickly slipped off the shaft. The type-segment shaft passes through and is guided by the apertures in center-piece cross-bars 19 and 26. It is prevented from turning by a pin or screw passing through the lower cross-bar into a longitudinal groove in the same; but any other means may be employed. Its downward movement is arrested by an adjustable collar, as 30, provided with a vertically-placed adjusting-screw, as 31, whose end abuts against cross-bar 26, and a coiled spring, as 29, which bears against said collar, and cross-bar 19 operates to hold it down. By these means elevation of the type-segment for bringing other rows of type into alignment with the impression-hammer is permitted, exact alignment of type-segment with impression-hammer is readily secured, and vertical movement or vibration of type-segment shaft prevented. For the single purpose of arresting the downward movement of the shaft, collar 30 would be sufficient, or even a permanent pin or shoulder on the shaft; but by the employment of screw 31 a more ready adjustment is secured, and by both combined a means is provided for adjusting at the same time the tension of the spring surrounding the shaft.

*Type-segment-oscillating mechanism.*—The oscillation of the type wheel or segment is effected by the following-described mechanism: In the standards 16 and hangers 37 of the center piece are secured the two shafts B. Hereon, extending from standard to hanger, are mounted sleeves, made preferably, for the sake of lightness, in skeleton form, carrying horizontal driving-arms *b*, arranged to extend over the said key-levers. These arms do not extend over levers 10, 13, and 14, since it is not the function of said levers to oscillate the type-segment. Said sleeves also carry vertical driving-arms *c*, which, for convenience of manufacture, are formed in two parts, united by screws 27. A spring, 25, secured to each arm, bears with one end against the lower cross-bar, 26, of the center piece, and operates to return the horizontal and vertical driving-arms to their normal position. The vertical and horizontal driving-arms, forming a driving-lever, extend substantially at right angles to each other, and resemble in form a bell-crank lever. I do not, however, limit myself to this particular form or kind of driving-lever, as any other kind of lever co-operating directly with the key-levers and with means connected with the type-segment to turn the latter is embraced within the scope of my invention. Each vertical driving-arm carries at its upper end a driving-finger, as 17, which operates, in conjunction with mechanism now to be described, to oscillate the type-segment. Surrounding the type-wheel sleeve is a stop-arm sleeve, as 20, provided with a stop-arm, as 21, which sweeps the field of the stop-pins. (Shown in several of my before-named patents.) Said stop-arm carries a vertical pin, as 22, which passes through an aperture in the tail-piece d of the type-segment D, so that motion communicated to the former may be transmitted to the latter. The stop-arm sleeve is held from vertical movement by any suitable means; but I have shown in the drawings as one means a screw inserted in the cross-bar 19, whose head overlaps the flanged base of the sleeve. The stop-arm carries on its upper surface curved flanges, as 35, the inner ends of which, as 24, act as driving projections, and which ends will be so called, and it is with these projections that the fingers 17 of the vertical driving-arms before described directly co-operate to impart movement in two directions to the type-wheel. Said driving projections 24 are placed at a certain distance from the axis of the type-segment shaft, which experience has demonstrated to be the most favorable location for the application of the driving-power. The operation of this combination of parts is briefly as follows: Depression of the right-hand key-levers will, through the medium of the right-hand horizontal and vertical driving-arms, finger 17, projection 24, stop-arm sleeve 20, stop-arm 21, pin 22, and type-segment tail-piece, turn said type-segment to the left, so as to bring any type on the right-hand side of the type-segment into alignment with the impression-hammer, while a movement of any left-hand key-lever will, through its driving-arms, &c., operate to turn the type-segment in the opposite direction. It is evident that each succeeding key-lever, considered from the median line outward, imparts a greater movement to the type-segment than its preceding one, from which it follows that the arrangement of type on the segment must correspond with that of the letters on the finger-keys. The nearer the operated key-lever is to the fulcrum of the horizontal driving-arm the greater the oscillation of the type-segment, and from this it may at first sight appear as if the form of said driving-arm, instead of being substantially straight, should correspond to the curve of the knife-edge fulcrum; but several factors operate to modify this form, notably the operation of the fingers 17 on the pins 24, the former moving in a substantially straight line, while the latter move in a circle, and the fact that the horizontal driving-arm rests only on the outer key-lever, being slightly elevated above the others (not shown) for the purpose of permitting one key to be partly depressed or to slightly yield to the touch of the finger before a previously-operated key has been released, as this has been found by experience to be desirable.

*Type-segment-returning mechanism.*—To return the type-segment to its normal position, various means may be availed of; but I have constructed the stop-arm so as to perform, in connection with the driving-fingers, this function. The arm proper is of sheet metal, and its flanges, as 35, and returning and arresting studs, as 32, are struck up therefrom. (See Fig. 18.) The said flanges, the ends of which act as driving projections, as before stated, are extended a certain distance horizontally, for a purpose which will hereinafter appear, and are curved to correspond with the curve of a circle drawn from the axis of the type-segment shaft as a center. Outside of this circle are placed the returning and arresting studs, as 32, and opposite these, also outside of said circle, stand the ends of the driving-fingers, as 17. As either driving-arm advances to move the type-segment its finger leaves its returning-stop and immediately strikes its driving projection, and as the driving-arm advances its finger enters the space between the said projection and stud, thus establishing a positive connection between the driving-arm and stop-arm. When, now, either driving-arm is being returned by spring 25 to its normal position, its finger operates on its returning-stud to return the stop-arm and type-segment to position, and only escapes from between said projection and stud when the type-segment has returned to its normal position. Said stop-arm, in connection with the driving-fingers, performs also another function—namely, of stopping the type-segment on its return at the normal position. This is accomplished through the medium of the opposite inactive driving-arm and its adjacent stop-arm returning-stud, the latter in returning abutting against the finger of the then inactive driving-arm, whereby its farther movement is arrested; but still another function is performed by said stop-arm—namely, that of locking either driving-arm in its normal position when the other is in operation, and this is due to the fact that when one arm has engaged the stop-arm and moved it more or less the flange 35 of the opposite driving projection is thereby presented opposite the other driving-finger, and acts to stop the forward movement of its adjacent driving-arm. These flanges are of a length sufficient to act as locks on the driving-arms for the full range of movement of the type-segment, and may therefore be called "locking-flanges." It is also evident from the construction shown that if two keys on opposite sides of the median line are simultaneously depressed no movement of the type-segment can take place. From the foregoing description it therefore appears that the stop-arm, in connection with other parts of the mechanism, performs the following functions: First, it drives the type-segment; second, it arrests it in the proper position; third, it returns it; fourth, it arrests it on its return at the normal position; fifth, it locks either driving-arm when the other is in operation; sixth, it prevents the simultaneous operation of two key-levers situated on opposite sides of the median line. In Figs. 5 and 6 a modification of the stop-arm is shown; but no claim is herein made to said modification.

*Type-segment-arresting mechanism.*—To secure perfect alignment of every type on the segment with an imaginary vertical line on the impression-hammer, the series of stop-pins, as 51, are provided, which rest on the key-levers and operate in conjunction with the stop-arm 21, in manner described in several of my former Letters Patent.

*Type-segment-elevating mechanism.*—To bring the second and third rows of type into alignment with the impression-hammer, the following-described mechanism is provided: On each side of the central spacing-key a lever, as 13 and 14, is arranged, which levers, to obtain sufficient leverage, are pivoted on rib 9, instead of on knife-edge 1. If the type-segment carries only two rows of type, only one lever is of course necessary. They are notched at 15, where they rest on rib 9, and their rear ends are shown as operating against the lower end of the type-segment shaft; but they may operate in apertures through the same or against laterally-projecting pins or studs thereof. Beneath the finger-keys 13' 14' of these levers, adjustable stops, as 28, passing through lugs cast on the bed-plate, are arranged, which, by limiting and adjusting the extent of the downward movement of said keys, operate to secure for each of said key-levers the proper vertical adjustment of the type-segment, so that its second and third row of type may each be brought into perfect alignment with the impression-hammer. Instead of arranging the stops under the finger-keys, they may be located over their levers, near the type-segment shaft, in supports the location of which will readily suggest itself, so as to limit and adjust their upward motion; but this arrangement, while it possesses some advantages, is not so readily accessible for adjustment as the arrangement shown. Over each of these type-segment-elevating key-levers is pivoted, at the front of the machine, a locking cam-lever, as 6, or a stop which, by its handle, can be turned to lock its key-lever in its depressed position, so that in cases where use is made, principally or exclusively, of the second or third rows of type, both hands are free for manipulation of the finger-keys. By providing this locking-lever with a cam-shaped end, the segment-elevating key-levers can be firmly locked in position.

*The carriage-feed mechanism.*—The feed mechanism—which, in addition to moving the paper carrier or carriage, also controls the impression-hammer—resembles in principle the invention described in my former Letters Patent No. 224,088, but differs substantially therefrom in its mechanism. In the standard, as 40, of the bed-plate, and preferably on the adjustable bearing-pins, as 39, is mounted the rocking feed-frame, whose front cross-piece, 38, extends over the rear ends of the several key-levers, and whose rear part or shaft, as 41, is provided with a rearward extension, 42, carrying an adjustable screw projection, 43, resting on the pawl-arm 44 of escapement-pawl 48, which latter is secured in the bed-plate to the end of a horizontal shaft impelled by its surrounding spiral spring to turn in a direction to cause said arm 44 to rest against the upper end of the bed-plate slot, through which it projects. The spring surrounding the pawl-shaft has one end secured to or resting against the bed-plate, while its other end bears against a projecting set-screw, which passes through and adjustably secures a collar on said shaft. This collar is placed as shown to retain the pawl-shaft in place, and serves, also, as is evident, as a means for varying the tension of the spring. With this escapement-pawl 48 co-operates an escapement-wheel, K, fixed on shaft 97. This shaft 97 carries a rigidly-fixed disk, 96, provided with a spring-pawl, 98, and also a loose sleeve, 95, which, on one end, is provided with a pinion, 94, for engagement with a rack-bar of the carriage, and on the opposite end with a ratchet-wheel, 175, which latter co-operates with the before-mentioned spring-pawl 98 in a manner to cause shaft 97 and its escapement-wheel K to move with the sleeve when the operating-spring of the carriage pulls the latter, through its pinion, to the left, and which pawl rides freely over said ratchet-wheel when the carriage is pushed to the right. Shaft 97 further carries, loosely mounted thereon, adjacent to the escapement-wheel K, the hammer-returning arm or lever 45, regulated in its downward movement by an adjustable stop, as 50, and provided with an aperture for the hammer-arm stud 47, (see Fig. 17,) and with a hammer-setting escapement-pawl, 46, the latter carrying, near its operative end, a pin or stud, which extends into the vertical slot of an arm or extension of escapement-pawl 48. This pawl 46 may be directly mounted on the hammer-arm, and lever 45 dispensed with; but this is not my preferred construction. The operation of this combined feed and hammer-operating mechanism is as follows: Operation of a key-lever elevates the pivoted cross bar 38, and in consequence depresses its rear extension, 42, which in turn depresses pawl-arm 44 and causes its pawl 48 to engage and lock the escapement-wheel K; but as soon as this engagement is effected hammer-setting escapement pawl 46 is removed from engagement with escapement-wheel K by the vertically-slotted arm of said pawl 48, and immediately rises in obedience to the force of the hammer-impelling spring transmitted through lever 45, taking its new position opposite the next succeeding space between the teeth of the escapement-wheel. When, now, the key-lever is released, the spring surrounding shaft of escapement-pawl 48 throws up arm 44 thereof and releases said pawl from engagement with said escapement-wheel; but simultaneously with or immediately preceding this release the vertical arm of pawl 48 carries pawl 46 forward into engagement therewith. As this pawl is held in its elevated position by the hammer-impelling spring, and as this spring is weaker than the carriage-propelling spring, it follows that the pawl 46 cannot prevent the escapement-wheel, and therefore the carriage, from moving, and which movement effects the required feed of the paper. The transmission of motion from the carriage-operating spring to the escapement-wheel K is effected through the means of the cogged wheel M on the periphery of the casing S, surrounding said spring, which wheel gears with the carriage rack-bar 70. Said rack-bar in turn operates pinion 94 of the ratchet-wheel-carrying sleeve, and this, through pawl 98 of disk 96, turns the shaft 97 and its escapement-wheel K. The described escapement mechanism is applicable where it is not combined with a hammer, for it is immaterial whether the lever 45 is elevated indirectly with the hammer-spring or directly by a spring whose only function is directed to that end. Beneath the adjustable stop 50 of the hammer-setting lever 45, in or on a projection of the bed-plate, is provided a yielding abutment for said stop, (shown in dotted lines in Fig. 2,) consisting, preferably, of a rubber block, for the purpose of relieving the carriage-spring from sudden shocks, diminishing noise, and securing smoothness of operation. Instead of providing the bed-plate with a yielding abutment, the end of the stop 50 may be provided with such rubber block.

*The impression-hammer and operating mechanism.*—The hammer and its operating mechanism may now be described. On shaft O, journaled in standards of the bed-plate, the branched or bifurcated end of hammer-arm L is mounted. The two branches l l of said vertical arm are widely separated to maintain it in the desired vertical plane. Its vertical arm is T-shaped in cross-section to insure the necessary rigidity. The lower end of the vertical part, situated at some distance behind the pivot of its horizontal branched part, works freely in a slot of a hollow post projecting from the bed-plate, (see Fig. 17,) which post carries the hammer-operating spring 52 and a spring-protecting anti-friction button, the latter abutting directly against the hammer-arm. The lower end of the spring abuts against the end of an adjusting-screw, as clearly shown in the drawings, Fig. 17, by which screw the tension of the spring may be adjusted. A stud, 47, projects rearwardly from the latter into an aperture in the hammer-returning escapement-lever, by this means connecting these parts. The operation of this hammer mechanism is as follows: As before described, the depression of a key-lever releases pawl 46 from engagement with the escapement-wheel, which, by the superior force of the carriage-operating spring, had held it down, overcoming the upward pressure of the relatively weaker hammer-spring, which latter, now being unrestrained, operates the hammer, and in so doing elevates lever 45 and its pawl 46. When, now, the key-lever is returned to normal position, pawl 48 is released from and pawl 46 again engaged with escapement-wheel K; but, as before explained, this depresses pawl 46, which in turn depresses hammer-returning escapement-lever 45, and the latter, through stud 47, returns the hammer to its normal position, compressing its operating-spring, and thus storing up power to be expended upon the next following depression of any key-lever. The relative location of the hammer-face type-wheel and inking-ribbon is the same as shown in some of my patents, and the operation of making an impression need not therefore be described.

*The word-spacing mechanism.*—The word-spacing mechanism consists of a key-lever, as 10, having a finger-key, as 10', preferably arranged centrally, as shown, so that it may not operate the type-wheel-driving arms. It may, however, have any other location and be cut away so as not to act on said arms; also, several of them may be provided, if desired. One may be located at or near each end, and the two be joined by a semicircular finger-bar extending in front of the key-levers, as is usual in the class of type-writers in common use; but I consider the construction shown, which I have provided with an enlarged finger-key, as the most desirable. This spacing-key acts, as do all the other keys, on the cross-bar 38 of the escapement mechanism; but it also acts on a hammer-checking mechanism, which prevents the hammer from accomplishing the full length of its stroke, which provision is necessary, since the escapement mechanism also operates the hammer.

*The hammer-checking mechanism.*—The hammer-checking mechanism is arranged as follows: Between the hangers 37 of the center piece, on the inner projecting ends of shafts B, is pivoted a hooked lever, 55, whose forward end is elevated by the depression of the spacing-key only, (see Fig. 4,) causing its rearwardly-extending hooked end to engage with a pin, 54, on a forwardly-extending tail-piece, 53, connected to or integrally forming a part of the bifurcated hammer-arm, which engagement checks and limits the forward motion of the hammer, permitting it, however, to move sufficiently to insure the operation of the spacing mechanism. Instead of the hooked lever engaging with an extension of the hammer-arm, it could be arranged to engage with the hammer-arm directly. The spacing-key could also be extended and formed at its end so as to act as a catch to hold the hammer, and in this case the hooked lever would be dispensed with.

*The inking mechanism.*—The inking mechanism may be described as follows: In the bottom flanges and top ears of the center piece two vertical shafts, 63, are mounted, one on each side, provided above said ears with a fixed collar, 64, having a flanged part, on which the ribbon-spool M' rests, and a coned part, on which a split sleeve, 65, fits. To prevent rotation of the split sleeve on the cone, the latter is provided with a pin, which fits between the ends of the sleeve. (See Fig. 9.) The upper end of the shaft is screw-threaded to receive a coned nut, 66, provided with a milled head for convenient manipulation. The diameter of said head and nut is less than that of the aperture in the spool, so that the latter can be removed by merely loosening instead of first entirely removing the said nut. When the split sleeve, the coned nut, and the spool are in place, the latter may be clamped to the shaft by turning down the nut, whereby the oppositely-coned parts spread the split sleeve and press it against the surface of the aperture in the spool. This mechanism permits the quick insertion, removal, clamping, and unclamping of a spool without removal of any other parts. Each ribbon-spool shaft is held against vertical displacement by a screw or pin, which, passing through the lower bearing, enters a peripheral groove of the shaft. This screw may be located in the upper bearing, if desired. Each shaft also carries a worm-gear, 62, which worm-gears engage, respectively, with right and left handed worms 61 on a transverse shaft, 60, mounted in bearings in the center piece. This worm-provided shaft also carries a ratchet-wheel, 59, and on one of the side arms of the rocking feed-frame is pivoted a weighted pawl, 58, which, when said frame is elevated by the key-levers to feed the paper-carriage, engages this ratchet-wheel 59, and is so placed with regard to the latter that it will rotate the same and its worm-shaft in a direction to cause the ribbon-spool shafts to turn from each other, considered with relation to the position of the inking-ribbon. The purpose of the quickly-operated and efficient spool-clamping mechanism described will now be apparent. When the machine is in operation, one of the spools must be unclamped, so that the other clamped spool can pull and take up the ribbon from the former, which is free to move and in a direction contrary to that of its vertical shaft. To reverse the direction of motion of the inking-ribbon, the clamped spool must be unclamped, and vice versa. By slightly clamping the spool from which the ribbon is pulled, the desired tension on the ribbon is secured.

The key-levers can be relieved and the operation of moving the vertical ribbon-spool shafts can be transferred to the carriage-spring by means of a transverse shaft geared to the carriage-rack and to said worm-shaft; but I prefer the construction illustrated. The inking-ribbon passes from spool to spool in front of the vertical upwardly-extending flange 166 of a guard rim or plate, 67, supported a suitable distance above the upper center-piece plate by two standards or posts, 12, and cut away adjacent the impression-hammer, as shown in Fig. 8. Said rim supports two vertically-slotted posts, 68, which receive in their slots the ends of a thin flexible metal sheet, 69, apertured opposite the impression-hammer, (see Fig. 8 and 19,) and secured in said slotted posts by clamping-screws, as clearly shown in Fig. 19. This arrangement permits the shield to yield when an impression is being made, so that the type of the segment may be encompassed by the sides of the aperture in the shield and protrude through it. Instead of this construction, the upper ends of these posts might be cone-shaped and screw-threaded, and a nut fitting over the same might clamp the parts together, thus holding the shield in the slot. Said flexible apertured plate or shield presses against the vertical guard-flange, (see Fig. 8,) and operates to maintain the inking-ribbon, which passes between it and said guard-flange, in its proper vertical position, said ribbon being also prevented from sagging by the horizontal rim of the guard-plate. The flexible apertured plate also acts as a shield, preventing contact of the inking-ribbon with the paper, except opposite the impression-hammer at the time an impression is made, and the vertical flange of the guard-plate also protects the type-wheel and adjacent mechanism. This flexible plate is provided with two apertures closely adjacent to each other, of which one, as 56, is opposite the impression-hammer, while the other, as 57, is farther to the left. The function of the first-named slot or aperture is obvious. The other is provided for the purpose of preventing contact of that part of the paper on which an impression has just been made with the said flexible plate, so as not to blur the not yet sufficiently dry impression. When the following impression is being made the previously-made impression will be opposite this opening, and the movement of the impression-hammer against the paper cannot operate to blot or cause to offset on the shield the previously-made impression.

*The paper-carriage and attachments.*—The arrangement and construction of the paper-carriage, with its several attachments, are as follows: On the bed-plate are mounted three grooved rollers, 71, on which the rabbeted carriage-rack 70 moves, its rabbets resting on the flanges of said rollers, while its cogs N are guided between the same. It is actuated by the circular rack on the periphery of the casing inclosing the operating-spring, which mechanism is of the usual construction, and mounted on the bed-plate in the usual manner. To retain said rack-bar in position on the rollers, a retaining-bar (see Figs. 2 and 5) having flanged arms 72 is screwed to a standard on the bed-plate, with the flanges of said arms resting on the said rack-bar. Near the ends of said carriage rack-bar are fastened the carriage ends Q R, preferably of the open form shown, so as to permit the insertion of paper of any width. Each is rabbeted on the side facing the other, to receive the ends of a flexible hard-rubber sheet or case, 183, curved to a corresponding form, and held therein by any suitable means. The longitudinal edges of this curved sheet or case are re-enforced by a metal binding, 75, bent to form inwardly-projecting flanges 76, to insure the folding of the paper within the case or cylinder in whichever direction it may chance to turn when first inserted therein, by passing it between the rollers hereinafter described. Each end is formed with an arm, as 74, and these arms are connected by the guide-rod, as 73, which rests on and is guided by center-piece cross-bar 19. (See Fig. 5.) Instead of resting on said plate, said rod may rest on a roller or rollers, preferably beveled on the side toward the carriage and secured to said plate. The paper or material on which the impression is to be made is held in the bite of two rollers, O' P, one of which, as P, is held in stationary bearings of the carriage ends, while the other, as O', is journaled in hangers 77, (see Figs. 12 and 13,) rigidly secured to hanger cross-rod 78, journaled in the vertical arm 79 of the carriage ends. Said hanger cross-rod 78 is provided with a spring, as 80, arranged to rock or turn the shaft in a direction to press said roll O' through the hangers forward into contact with roll P. This spring may be arranged at one end only or at both ends, and in lieu of this construction a flat spring or springs secured to the carriage end or ends and bearing on the free ends of the hangers may be adopted. To separate the rollers (which are rubber covered) for the insertion of the paper, a cam-lever or roll-opener, 81, having a cam-notch and a handle or thumb-piece, is pivoted to the right-hand carriage end and engages with the extended shaft 78' of the rubber roll O'. Depression of said roll-opener separates the rolls, while elevation of the same allows the before-mentioned spring to bring the rolls into contact to grip the paper. The extended shaft 78' is provided with a milled head, 82, whereby, when the ratchet on the other end of its roll O' is released, said roll may be turned in either direction for adjustment of the paper. To effect line-spacing or vertical feed of the paper, the following-described mechanism is provided: On the end of roll O' a ratchet-wheel, 90, is fixed, (see Figs. 10 and 11,) and adjacent thereto, on the shaft of said roll, is loosely mounted a click-lever, 87, to which is pivoted the click or pawl 88, held in engagement therewith by a spring, 89. This pawl is provided with a handle, by which, when the same is lifted to abut against the stop on click-lever 87, it is disengaged from the ratchet-wheel, so that roll O' is free to turn in either direction. The adjacent roll-hanger is provided with a stop, 91, so arranged with respect to said pawl 88 as to cause the latter to wedge between it and the ratchet-wheel, (see Fig. 10,) and thus limit the forward motion of said pawl. The purpose of the stop or lever 87 is to prevent the operative end of pawl 88 from passing outside of stop 91. On the opposite end of the click-lever, beyond its point or fulcrum, is formed a slot, with which the end 86 of the bell-crank thumb-lever 84 engages. This line-spacing thumb-lever is pivoted to the laterally-projecting lug 83 of the left-hand carriage end, and is provided at its pivot with a spring, 85, operating to throw the thumb-piece away from the said carriage end. Opposite said thumb-lever, on the vertical arm of said carriage end, is placed loosely on a screw-stud having an enlarged head a milled collar, 92, provided on the side facing the thumb-lever with a series of projections or stops, 93, of varying length, and on its opposite side, at corresponding places, with a series of holes or sockets, into which a projecting pin on the carriage end may fit to hold said collar against rotation on its stud. The aperture through the collar is stepped to form a ledge, against which one end of a spring surrounding the screw-stud abuts, while the opposite end of said spring rests against the enlarged head of said screw-stud. By sliding the collar on its stud away from the carriage end against the pressure of the spring, it may be disengaged from the pin thereon, and then rotated to bring any other one of the series of stops into alignment with the arm 84 of the thumb-lever. This thumb-lever is placed on the left side of the machine and in the position shown, so that the operator in returning the carriage to position to commence a new line will by the same motion also operate said thumb-lever. This operation will depress its inner end, 86, to an extent determined by that stop on the collar against which its vertical arm abuts, and this downward movement will elevate the rear end of pawl-lever 87 and cause its attached pawl to slip the determined distance over its ratchet-wheel. When, now, the thumb-lever is released, its spring returns the several parts to position; but the pawl, having engaged the ratchet-wheel, will turn it and its roll O', and consequently move the paper until said pawl is wedged against stop 91. If a greater or less line-space is desired, a shorter or longer stop is interposed in the path of the thumb-lever by adjustment of the collar, as before described. In returning the carriage to position it is desirable to prevent the possible operation or movement of the escapement mechanism, which may occur through friction of the parts on each other, and to this end I have fixed to the escapement-pawl 48 a flat steel spring, 49, arranged to extend with its free end between the teeth of its escapement-wheel K, and to permit the teeth of said wheel to slip by when the wheel turns in the direction of the arrow, but to bind thereon, so as to prevent motion in the opposite direction. It is often desirable to advance the paper-carriage a considerable distance; and to do this quickly with one motion of the hand and in any position of the carriage, instead of by the step-by-step movement, the following-described mechanism is employed. At the ends of the carriage-rack, on studs 104, short links 103 are pivoted, (see Fig. 12,) (if desired, one of these links may be pivoted to the carriage end,) which are joined by a longitudinal disengaging-rod, 102, lying in front of and parallel to said rack. This rod can be moved rearward by a finger-lever, 105, pivoted on the left-hand carriage end, and connected at its lower end to said disengaging-bar, a spring, as 106, operating either directly or indirectly to move it forward. (See Figs. 2, 3, and 22.) This disengaging-bar rests in a depression, or is otherwise secured to the disengaging-sleeve, composed of side arms, 100, yoke 101, and collar 99, which is mounted on shaft 97 and moved longitudinally thereon by said disengaging-bar. The collar on the rear end of this sleeve is cone-shaped, and is fitted to closely slide over ratchet-wheel 175, (see Fig. 15,) and, when moved rearward by the disengaging-rod, operates as a cam to disengage the spring-pawl 98 of disk 96 from the said ratchet-wheel. It should here be stated that pawl 98 is beveled on the side adjacent to the cone-shaped collar, so that said collar can lift the pawl out of engagement with the ratchet-wheel. As this disengagement frees the sleeve which carries said ratchet-wheel and pinion 94 from connection with shaft 97, and so with escapement-wheel K, it is evident from the operation of the escapement mechanism that the restraint on the carriage-spring is removed, which now rapidly moves the carriage to the left, restrained only by the hand of the operator, who releases his hold on the operating-lever and carriage when the desired location of the latter is reached. The position of the operating-lever on the carriage insures the presence of manual restraint on the carriage-spring at the instant the disengaging mechanism is operated. A spring may be placed to operate directly on the disengaging-frame to return it to normal position, or the spring may operate directly on the disengaging-bar. The vertical extensions of the carriage ends are provided with broadened tops, which are connected by a broad and rigid metal sheet, 178, which serves the purpose of an erasing-tablet over which the paper can be bent without removing it from the carriage. To these vertical extensions is also attached by pivots the paper-supporting rack, whose side arms, resting against pins, support it in the necessary inclined position. To the hangers of the carriage-roll O' are secured the ends of a thin flexible sheet, preferably of rubber, which is interposed between the paper and the impression-hammer, and serves to compensate for possible inequalities of surface of the type on the segment.

*The signaling mechanism.*—The signaling mechanism for giving notice of the proximity of the end of a line is arranged as follows: The bell 177 is fixed on the impression-hammer arm in a position substantially in line with the hammer end. (See Fig. 5.) It is, together with a weight arranged in its cavity, secured to the hammer-arm by a screw. This arrangement secures the necessary momentum for the hammer and utilizes the bell to assist in that function. When the bell is itself made sufficiently heavy, the weight may be dispensed with. The bell-hammer 176 is pivoted to a lateral extension of a semi-cylindrical skeleton frame, T, whose ends 179 grasp the roll-hanger shaft 78 under the erasing-tablet, (see Fig. 12,) being firmly held in place by the grooved arm 180 thereof, which fits the edge of the erasing-tablet. This construction permits a longitudinal adjustment of the bell-hammer on the carriage. The rearward extension or tail of the bell-hammer abuts against the under side of the erasing-tablet, and determines the proper position of the said hammer for engagement with the bell when the part of the carriage to which the bell-hammer is fixed arrives opposite its bell, secured as before described. The separate stop-arm and attached sleeve can also be employed when the type-segment carries but one row of type, and is rigidly secured to its shaft instead of turning on the same.

It is obvious that the mechanism herein shown for moving the type-segment is also applicable to the movement of a flat type-plate, for the type-wheel could be transformed into a pinion gearing with a rack on the rear of a type-plate, suitably guided; or an arm could be substituted for the type wheel or segment, for engagement with such plate by means of a sliding connection; but this mechanism is not claimed herein, but is reserved for a future application.

All matter herein described or shown, but not claimed, being of my invention, is not thereby abandoned, but is reserved to be claimed in future applications.

I do not herein claim a hard-rubber type-wheel *per se*, nor such a wheel provided with several rows of type, in combination with a series of key-levers and intermediate driving mechanism, as these matters will constitute the subject-matter of a future application.

Having fully described my invention, what I desire to claim herein, and secure by Letters Patent, is—

1. The combination, substantially as described, with a type wheel or segment constructed of hard rubber, provided with two or more alphabets of type, arranged with each alphabet confined to one row, of a series of key-levers, a propelling mechanism between said type-segment and key-levers, and a stop mechanism, all substantially as described.

2. The combination, substantially as described, with the type-segment, of the shaft whereon it is mounted, the spring operating on said shaft, and a stop on the latter for limiting its movement.

3. The combination, substantially as described, with an oscillating type wheel or segment carrying several rows of type, as described, of a sliding non-oscillating shaft whereon said type-segment is mounted, and a properly-adjusted shifting key lever or levers arranged to move said shaft and shift its type-segment, for the purpose set forth.

4. The combination, substantially as described, with an oscillating type wheel or segment carrying several rows of type, as described, of a sliding non-oscillating shaft whereon said type-segment is mounted, and a properly-adjusted shifting key lever or levers arranged to operate directly against end of shaft to move the same and shift its type-segment.

5. The combination, substantially as described, with an oscillating type wheel or segment carrying several rows of type, as described, of a sliding non-oscillating shaft whereon said type-segment is mounted, and a properly-adjusted shifting key lever or levers arranged to move said shaft and shift its type-segment, and a spring arranged to operate on said shaft in opposition to the force of the shifting key-lever.

6. The combination, substantially as described, with an oscillating type wheel or segment carrying several rows of type, as described, of a sliding non-oscillating shaft whereon said type-segment is mounted, means, substantially as described, for regulating its adjustment, and through it that of the type-segment, and a properly-adjusted key lever or levers arranged to move said shaft and shift its type-segment, for the purpose set forth.

7. The combination, substantially as described, with an oscillating type wheel or segment carrying several rows of type, as described, of a sliding non-oscillating shaft whereon said type-segment is mounted, means for regulating its adjustment, and through it that of the type-segment, and a properly-adjusted key lever or levers arranged to move said shaft and shift its type-segment, and means for adjusting the movement of said shifting key lever or levers, all substantially as described.

8. The combination, substantially as described, with an oscillating type wheel or segment carrying several rows of type, as described, of a sliding non-oscillating shaft whereon said type-segment is mounted, a properly-adjusted shifting key lever or levers arranged to move said shaft and shift its type-segment, and a locking lever or levers for holding in position the shifting-levers.

9. The combination, substantially as described, with the type-segment and its shaft, of an adjustable collar on said shaft, an adjustable screw passing through said collar, which abuts against the center piece, and a spring around said shaft, whereby the tension of the spring and the adjustment of the shaft may be regulated, all substantially as described.

10. The combination, substantially as described, with a sliding non-rotating shouldered shaft, of a type-segment carrying several rows of type, and provided with an extended sleeve fitting over and resting against the shoulder on said shaft, means for preventing longitudinal displacement while permitting rotation of type-segment thereon, and means for sliding said shaft.

11. The combination, substantially as described, with a type-wheel and its shaft or extended hub, of a sleeve surrounding said shaft or hub, provided with a stop-arm connected to the type-segment, and with projections for co-operation with the type-segment-driving arms.

12. The combination, substantially as described, with a type wheel or segment and its shaft or extended hub, of a sleeve surrounding said shaft or hub, provided with a stop-arm connected to the type-segment, and with projections for co-operation with the type-segment-driving arms, and with means, substantially as described, for stopping said segment at the neutral position on its return movement.

13. The combination, substantially as described, with a type-segment provided with several rows of type, and an extended sleeve or hub fitting on a shaft, of a stop-arm sleeve provided with means for co-operation with the type-segment-driving arms, and whose stop-arm has a sliding connection with said segment.

14. The combination, substantially as described, with a type-segment provided with several rows of type, as described, and connected with a shaft, means for shifting said shaft to correspondingly shift the type-segment, means, substantially as described, for rotating said type-segment, arranged so as not to partake of the sliding movements of the shaft, and a series of finger-key levers operating on said segment-rotating means, all substantially as described.

15. The combination, substantially as described, with a type-segment, of a series of finger-key levers and two driving-levers which directly co-operate with the key-levers, and with means, substantially as described, connected to the type-wheel, to turn the latter.

16. The combination, substantially as described, with a type-segment, of a series of segment-rotating key-levers uniform in size and shape, and a driving-lever lying across the key-levers in position to be moved unequally by the key-levers, arranged to properly co-operate therewith.

17. The combination, substantially as described, with a type-segment, of a series of key-levers uniform in shape and size, and intermediate mechanism consisting of two driving-levers whose arms adjacent to the key-levers are arranged across the same in the position substantially as shown and described, and whose other arms co-operate with projections connected with the type-segment.

18. The combination, substantially as described, with a type-segment, of a series of key-levers arranged on lines radiating from the type-wheel shaft as a center, and two levers whose arms adjacent to the key-levers are so placed as to be moved by the latter a distance which decreases as the distance of the operated key-lever from the fulcrum of the lever increases.

19. The combination, substantially as described, with a type-segment, of a series of finger-key levers, a pair of driving-levers, a stop-arm sleeve surrounding the type-segment shaft, connected through its arm to said segment, and provided with projections for co-operation with the said driving-levers.

20. The combination, substantially as described, with a type-segment having an extended hub, of a shouldered shaft and a sleeve fitting over and surrounding said hub and connected positively with the type-segment.

21. The combination, substantially as described, with a type-segment having an extended hub, of a shouldered shaft and a sleeve fitting over and surrounding said hub, and having a stop-arm connected positively to the type-segment near the free end of said arm.

22. The combination, with the key-levers, of the two driving-levers and the stop-arm provided with the curved locking-flanges, as 35, substantially as described.

23. The combination, with the key-levers, of the two driving-levers and the stop-arm provided with two driving projections, as 24, and two returning and arresting studs, as 32, whereby a positive connection is formed between the driving-levers and the stop-arm, substantially as described.

24. The combination, substantially as described, with the key-levers, of the two driving-levers and the stop-arm provided with means, substantially as described, whereby either driving-lever, in moving forward, enters into positive connection with the same, and in returning recedes from such connection.

25. The stop-arm provided with two curved locking-flanges, as 35, forming driving projections, as 24, and with two returning and arresting studs, as 32, substantially as described.

26. The stop-arm provided with two locking-flanges, forming driving projections, and two returning and arresting studs, the latter placed outside of the circle described by said locking-flanges, substantially as described.

27. The combination, substantially as described, with the type-segment, of the key-levers, a pair of driving-levers whose driving-arms are provided with laterally-projecting driving-fingers, and a sleeve surrounding segment-shaft provided with driving projections and connected to said type-segment.

28. The combination, substantially as described, with the type-segment, of a series of key-levers, a pair of driving-levers whose driving-arms are provided with laterally-projecting driving-fingers, and a sleeve surrounding segment-shaft connecting with type-segment, and provided with driving projections and returning and arresting studs.

29. The combination, substantially as described, with a type-segment provided with several rows of type, as described, of means for shifting said type-segment, a stop-arm connected with said type-segment and arranged to be unaffected by the shifting of the same, so as to move at all times in the same plane, and a series of stop-pins operated by the key-levers and co-operating with said stop-arm, all substantially as described.

30. The combination, substantially as described, with a type-segment and its vertical shaft, of a stop-arm connected to said shaft at one end and to the type-segment tail-piece near its other end.

31. The combination, substantially as described, with the vertical shaft and its type-segment provided with several rows of type, of a stop-arm connected to said shaft at one end and by a sliding connection to the type-segment tail-piece near its other end.

32. The combination, substantially as described, with the type-segment, of a series of key-levers, a pair of bell-crank driving-levers, the arms of each of which are secured, respectively, to the opposite ends of a long sleeve mounted on a stationary shaft, and springs for returning said levers to position.

33. The combination, substantially as described, with the spacing key-lever and the escapement mechanism, of the hammer-arm and the hammer-restraining lever, the latter tilted by said spacing-lever to engage the hammer-arm or an extension thereof, for the purpose of preventing the hammer from completing its stroke.

34. The combination, substantially as described, with the key-levers, of the escapement frame wheel and pawl, the latter normally pressed out of engagement with the escapement-wheel and provided with a slotted arm, the hammer-returning lever loosely connected with the hammer-arm, and provided with a pawl engaged by said slotted extension of the escapement-pawl, the hammer-operating spring, the clutch mechanism on the shaft of the escapement-wheel, and the pinion operated by the carriage-rack.

35. The combination, substantially as described, with the carriage spring and rack, of the escapement-wheel and the pinion and clutch mechanism on the shaft thereof, the hammer-setting lever loosely connected by means of stud and slot with the hammer-arm, and carrying a pawl for engagement with the escapement-wheel, and means, substantially as described, for bringing said pawl into and releasing the escapement-pawl from engagement with the escapement-wheel.

36. The combination, substantially as described, with the carriage spring and rack, of the escapement-wheel and the pinion and clutch mechanism on the shaft thereof, the hammer-setting lever pivoted on the same shaft, loosely connected with the hammer-arm, and carrying a pawl for engagement with the escapement-wheel, and means, substantially as described, for bringing said pawl into and releasing the escapement-pawl from engagement with the escapement-wheel.

37. The combination, substantially as described, with the key-levers, of the escapement-frame provided with a rearward extension, the escapement wheel and pawl, the latter provided with a lateral extension passing through a stop-slot in the bed-plate normally pressed out of engagement with the escapement-wheel, and provided, further, with a slotted arm, the hammer-returning lever loosely connected to the hammer-arm, and carrying a pawl engaged by the slotted arm of the escapement-lever, the hammer-operating spring, and the clutch mechanism and pinion operated by the carriage-rack.

38. The combination, substantially as described, with the hammer-arm, of the hammer-setting lever provided with a stop for limiting its downward movement, and the hammer-operating spring.

39. The combination, with the lever, as 45, of the escapement mechanism provided with a stop, as 50, for limiting its downward movement, and the bed-frame provided with a yielding abutment opposite said stop, for the purpose set forth.

40. In a type-writing machine, the impression-hammer provided with a bell.

41. The combination, with the impression-hammer provided with a bell, of the bell-hammer adjustably secured to the paper-carriage, substantially as described.

42. The combination, with the impression-hammer provided with a bell, of the bell-hammer pivoted to a bracket adjustably secured to the paper-carriage, substantially as described.

43. The combination, with the hanger-rod and erasing-table of the paper-carriage, of the bell-hammer bracket fitting over said rod, provided with a grooved arm which engages the edge of the erasing-table, and carrying the pivoted bell-hammer, substantially as described.

44. The combination, with the paper-carriage, of the bell-hammer bracket carrying the pivoted bell-hammer, the latter provided with a tail-piece abutting against the paper-carriage to limit its return movement after being struck by the bell, substantially as described.

45. The combination, substantially as described, with the paper-carriage, of the longitudinal releasing-rod connected thereto, and shifted by an attached finger-lever, the disengaging-frame having a conical operating end and a sliding connection with said releasing-rod, the disk and its beveled pawl, and the pinion and ratchet carrying sleeve, all arranged on the shaft of the escapement-wheel.

46. The combination, substantially as described, with the paper-carriage, of a releasing-rod and finger-lever attached thereto, and means, substantially as described, operated by said rod, for releasing the carriage from connection with the escapement-wheel, whereby the carriage may be released and the presence of manual restraint on the movement of the carriage at the moment of release is secured.

47. The combination, substantially as described, with the worm-shaft provided with right and left hand worms and a ratchet-wheel, the vertical ribbon-spool shafts provided with worm-gears for engagement with said worms, the escapement-frame provided with a pawl for turning said ratchet-wheel, the ribbon-spools, and means for clamping them to the vertical shafts, all substantially as described.

48. The combination, substantially as described, of two ribbon-spools, an inking-ribbon, and means for clamping them to their shafts, with means for causing said shafts to revolve in opposite directions at the same time, all substantially as described.

49. The combination, substantially as described, of two ribbon-spools, an inking-ribbon, and means for clamping them to their shafts, with means for causing said shafts to revolve in opposite directions at the same time, set in motion by the key-levers, all substantially as described.

50. The combination, with the ribbon-spool shaft provided with a flange for the ribbon-spool, a conical seat, and a screw-threaded end, of the split sleeve and the clamping-nut having a cone-shaped end, substantially as described.

51. The combination, with the ribbon-spool shaft and clamping means, of the ribbon-spool having a central opening through the same larger than the clamping means, so that the spool can be removed without removing any other part or parts, all substantially as described.

52. The combination, with the inking-ribbon spools, of the type-wheel guard having a horizontal and vertical part, and the paper-protecting shield whereby the inking-ribbon is guided and supported.

53. The combination, substantially as described, with the type-segment, inking-ribbon, and impression-hammer, of the shield, as 69, provided with two apertures, one opposite the impression-hammer and the other adjacent thereto on that side toward which the carriage travels, for the purpose set forth.

54. The combination, substantially as described, with the type-segment, inking-ribbon, impression-hammer, and the flexible shield, as 69, apertured opposite the impression-hammer, of the vertical posts, as 68, slotted to receive the ends of said shield, and provided with apertures for the reception of clamping-screws, whereby the ends of the shield are securely held and can be readily removed and re-inserted, if desired.

55. The type-wheel guard having a horizontal and a vertical part, and secured a suitable distance above the center piece to permit the movement of the stop-pins, cut away opposite the hammer, and carrying the supports for the paper-protecting shield.

56. A paper-carriage provided with a paper-holding receptacle open in the plane of the bite of the pressure-rollers and at its opposite ends, substantially as described, whereby the insertion of sheets of any width is permitted.

57. The combination, with the paper-carriage-supporting bars, of the open-end frames and the intermediate longitudinally-open shell or case, substantially as described.

58. The paper-carriage consisting of a rack-bar, guide-bar, open-end frames, pressure-rollers, and a longitudinally-open cylindrical shell or case of suitable material, fitted between the end frames.

59. The paper-carriage end frames, in combination with the longitudinally-open cylindrical shell fitted thereto, and provided with interiorly-projecting flanges for preventing the re-entrance of the paper between the pressure-rollers.

60. The combination, with the paper-carriage and its rack-bar, rabbeted on each side of its cogs, of the grooved supporting and guiding rollers, on the flanges of which the rabbets of the rack-bar rest.

61. The combination, with the paper-carriage and its rack-bar, rabbeted on each side of its cogs, of the grooved supporting and guiding rollers, on the flanges of which the rabbets of the rack-bar rest, and an operating-spring whose cogged casing directly engages with the rack-bar, and means for preventing vertical displacement of the latter, all substantially as described.

62. The combination, with the carriage end frames, of the stationary bearing pressure-roll, the swinging pressure-roll, journaled at each end in hangers secured to the end frames, and spring-pressed against the former, and a cam finger-lever operating on the extended shaft of the spring-pressure roll to separate the said rolls.

63. The combination, with the left-hand end frame of the paper-carriage, of a lever situated thereon to be operated by the hand simultaneously with the return of the said carriage to position, and mechanism connected with said lever and one of the carriage-rolls for turning the latter to effect line-spacing, all substantially as described.

64. The combination, with one of the end frames of the paper-carriage, of a finger-lever pivoted thereon, a pressure-roll provided with a ratchet-wheel, a ratchet-lever loosely mounted on the shaft of the same, and provided at one end with means for engagement with the said finger-lever and at its opposite end with a pawl, and a stop to limit the forward movement of the pawl in turning the ratchet, all substantially as described.

65. The combination, with one of the end frames of the paper-carriage, of a finger-lever pivoted thereto, the swinging pressure-roll carrying a ratchet-wheel, a ratchet-lever loosely mounted on its shaft, and provided at one end with a pawl and at its opposite end with a slot sufficiently long to prevent disengagement of said finger-lever therefrom when the roll is swung aside, and a stop projecting from the roll-hanger, and between which stop and the ratchet-wheel the pawl is wedged to limit the forward movement of the latter.

66. The combination, with one of the end frames of the paper-carriage, of a finger-lever pivoted thereon, a pressure-roll carrying a click-lever, and ratchet mechanism connected with said finger-lever, and a spring for returning the finger-lever and ratchet mechanism to position, and a stop which determines that position, substantially as described.

67. The combination, with one of the pressure-rolls of the carriage and its ratchet mechanism having a handle-provided pawl, of a button or equivalent means on the end of said roll for rotating the same in either direction, substantially as described.

68. A type-segment having a tubular extension or sleeve secured thereto to afford an extended bearing, in combination with a stationary or non-rotating shaft on which said segment is mounted, and means, substantially as described, for rotating the latter on said shaft, substantially as described.

69. The combination, substantially as described, with the type-segment-elevating key lever or levers, of the locking lever or levers, provided with a cam-shaped end for locking said key-levers in their depressed position.

70. The combination, with the bed-plate provided with a cavity the bottom of which is formed by the end of an adjustable screw, of the impression hammer arm and a spring fitted in said cavity, substantially as described.

In testimony whereof I have signed my name to this specification in the presence of two subscribing witnesses.

JAS. B. HAMMOND.

Witnesses:
FRANK L. MIDDLETON,
JOHN B. THOMPSON.